(12) United States Patent
Pierce

(10) Patent No.: X4046
(45) Date of Patent: Mar. 3, 1825

(54) EXCAVATING SCRAPER , SHOVEL

(76) Inventor: Thomas Pierce

Thomas Pierce

The Schedule referred to in these Letters Patent, and making
part of the same, containing a description in the words of the said
Thomas Pierce himself of his improvement in the Shovel for
excavating and removing earth.

Be it Known that I the said Thomas Pierce have invented a new
and useful improvement not Known or used before in excavating
& removing the earth in making and constructing canals, acque-
-ducts and ditches; turnpikes and other roads &c. to be called a scraper
or shovel, which invention and manner of using it as follows:
This improvement in the scraper consists of a cast-
-iron blade, cutting and front part, and part of the bottom being
cast solid together, the hind part of the bottom, the hind end of
the sides and handles to be of wood and wrought iron plates or
straps nailed or spiked the whole length on the top . . . . edge of
the sides and rivited through into the cast-iron at the hind part
of the blade, the edges of the blade at the sides rising and notched
so as to receive the wrought iron straps, the cast-iron part to be spiked
or rivited to the under edge of the sides, the sides and handles
being formed of planks and rounded on the top and under edge
nearly to a point at the forward ends of the sides so as to lay to the cast
iron and wrought iron plates also, the hind ends of the sides to
be slanted off up to the handles, the handles to be sloped down at
the hind ends nearly on an oval from the forward part of the
sides to the hind ends of the handles. The cast-iron part of the
scraper at the hind end and under the edges of the sides to be
thicker than the residue of the bottom and to be concave and convex
from the hind part of the cast-iron to where the blade commences,
except a little variation in the thickness of the castings, or hollowed
out from the hind end to the blade as last mentioned in the center one inch and a half as near as may be and at the sides where the handles go on two inches. the forward part of the bottom curving one inch and a half as near as may be forward the blade four inches and one inch and a half rounding forward and sloped or pitched so as that a straight stick laid on the top of the blade and running back as far as the hind end of the casting will lay five inches above the hind end of said casting the blade to be sharp at the forward edge and at the mid part where it joins the bottom [illegible] three fourths of an inch thick, the main part of the casting to be half an inch thick, the blade from the right to the left side to be concave convex one inch and a half as near as may be, or hollowed. This scraper when finished for use will be two feet ten inches wide; the sides including the handles will be three feet six inches long, the casting in the centre is fourteen inches from the hind part of it to where the blade commences on a straight line. This scraper is to be connected with the beam by a chain fastened to each side by a clevis or staples and managed by one or more persons and may be varied in size as occasion may require and managed to be drawn by one or more horses or oxen.

In witness whereof, I have hereunto subscribed my name this sixteenth day of February, one thousand eight hundred and twenty five.

Witnesses
[illegible] Joseph Holden }
[illegible] Noah Pennell }

Thomas Pierce ( [illegible]

Patented 3rd March 1825.

4046X

UNITED STATES PATENT OFFICE.

THOMAS PIERCE, OF HARTWICK, NEW YORK.

IMPROVEMENT IN EXCAVATING-SHOVELS.

Specification forming part of Letters Patent dated March 3, 1825.

*To all whom it may concern:*

Be it known that I, THOMAS PIERCE, of Hartwick, New York, have invented a new and useful improvement not known or used before in excavating and removing the earth in making and constructing canals, aqueducts, and ditches, turnpikes, and other roads, &c., to be called a "scraper" or "shovel," which invention and manner of using it is as follows:

This improvement in the scraper consists of a cast-iron blade, cutting and front part and part of the bottom being cast solid together; the hind part of the bottom, the hind end of the sides and handles to be of wood, and wrought-iron plates or straps nailed or spiked the whole length on the top edge of the sides and riveted through into the cast-iron at the hind part of the blade, the edges of the blade at the sides rising and notched, so as to receive the wrought-iron straps; the cast-iron part to be spiked or riveted to the under edge of the sides, the sides and handles being formed of planks and rounded on the top and under edge nearly to a point at the forward ends of the sides, so as to lay to the cast-iron and wrought-iron plates also; the hind ends of the sides to be slanted off up to the handles; the handles to be sloped down at the hind ends nearly on an oval from the forward part of the sides to the hind ends of the handles; the cast-iron part of the scraper at the hind end and under the edges of the sides to be thicker than the residue of the bottom, and to concave and convex from the hind part of the cast-iron to where the blade commences, except a little variation in the thickness of the castings, or hollowed out from the hind end to the blade, as last mentioned, in the center one inch and a half, as near as may be, and at the sides, where the handles go on, two inches, the forward part of the bottom curving one inch and a half, as near as may be, forward, the blade four inches, and one inch and a half rounding forward and sloped or pitched, so as that a straight stick laid on the top of the blade and running back as far as the hind end of the casting will lay five inches above the hind end of said casting; the blade to be sharp at the forward edge, and at the hind part, where it joins the bottom, to be three-fourths of an inch thick; the main part of the casting to be half an inch thick; the blade from the right to the left side to be concavo convex one inch and a half, as near as may be, or hollowed.

This scraper, when finished for use, will be two feet ten inches wide. The sides, including the handles, will be three feet six inches long. The casting in the center is fourteen inches from the hind part of it to where the blade commences on a straight line.

This scraper is to be connected with the team by a chain fastened to each side by a clevis or staples and managed by one or more persons, and may be varied in size as occasion may require, and managed to be drawn by one or more horses or oxen.

In witness whereof I have hereunto subscribed my name this 16th day of February, 1825.

THOMAS PIERCE.

Witnesses:
JOSEPH HOLDEN,
NOAH BURRELL.